United States Patent [19]

Wampler et al.

[11] Patent Number: 5,759,599

[45] Date of Patent: *Jun. 2, 1998

[54] METHOD OF FLAVORING AND MECHANICALLY PROCESSING FOODS WITH POLYMER ENCAPSULATED FLAVOR OILS

[75] Inventors: Daniel J. Wampler, Cincinnati; Jon C. Soper, Huber Heights; Theodore T. Pearl, Cincinnati, all of Ohio

[73] Assignee: Givaudan Roure Flavors Corporation, Cincinnati, Ohio

[*] Notice: The term of this patent shall not extend beyond the expiration date of Pat. No. 5,536,513.

[21] Appl. No.: 539,482

[22] Filed: Oct. 5, 1995

Related U.S. Application Data

[63] Continuation-in-part of Ser. No. 204,755, Mar. 2, 1994, abandoned, which is a continuation of Ser. No. 859,934, Mar. 30, 1992, abandoned, and Ser. No. 859,349, Mar. 30, 1992, abandoned.

[51] Int. Cl.⁶ ............................................. A23L 1/221
[52] U.S. Cl. .................. 426/89; 426/92; 426/94; 426/96; 426/98; 426/281; 426/241; 426/289; 426/296; 426/438; 426/516; 426/523; 426/641; 426/650
[58] Field of Search ................... 426/89, 96, 98, 426/438, 516, 523, 289, 296, 241, 92, 94, 281, 641, 650

[56] References Cited

U.S. PATENT DOCUMENTS

| | | |
|---|---|---|
| 2,886,446 | 5/1959 | Kramer et al. ............... 426/5 |
| 2,886,449 | 5/1959 | Rosenthal et al. .............. 426/5 |
| 3,565,559 | 2/1971 | Sato et al. . |
| 3,567,650 | 3/1971 | Bakan . |
| 3,647,481 | 3/1972 | Brodnitz et al. . |
| 3,965,033 | 6/1976 | Matsukawa et al. ............ 426/89 X |
| 4,386,106 | 5/1983 | Merritt et al. ............. 426/96 X |
| 4,515,769 | 5/1985 | Merritt et al. ............. 426/96 X |
| 5,023,024 | 6/1991 | Kyogoku et al. ........... 426/98 X |
| 5,051,304 | 9/1991 | David et al. ............. 428/402.2 |
| 5,536,513 | 7/1996 | Graf et al. . |

FOREIGN PATENT DOCUMENTS

| | | |
|---|---|---|
| 0246902 | 11/1987 | European Pat. Off. . |
| 0385535 | 9/1990 | European Pat. Off. . |
| 0401954 | 12/1990 | European Pat. Off. . |
| 0455598 | 4/1991 | European Pat. Off. . |
| 2057892 | 5/1971 | France . |
| 2233095 | 1/1975 | France . |
| 2570604 | 3/1986 | France . |
| 5936540 | 2/1984 | Japan . |
| 1327761 | 8/1973 | United Kingdom . |

OTHER PUBLICATIONS

*Snack Food* vol. 59, No. 5, p. 76, May 1970.
McKernan, W.M., "Microencapsulation in the Flavour Industry, Part II" The Flavor Industry, Feb. 1973, pp. 70–74.
Hawley, The Condensed Chemical Dictionary, 10th ed., 1981, VanNostrand Reinhold Co., New York, pp. 919–920.
S. Budavari et al., The Merck Index, 11th ed., 1989, Merck & Co., Rahway, NJ. p. 372—see "364.aluminium potassium sulfate".
P. B. Deasy, Microencapsulation and related drug processes, 1988, Marcel Dekker, New York and Basel, pp. 64–69.

*Primary Examiner*—Helen Pratt
*Attorney, Agent, or Firm*—Wood, Herron & Evans, L.L.P.

[57] ABSTRACT

A method of flavoring and mechanically processing foods by incorporating heat-stable and fracturable upon chewing polymer encapsulated flavor oil capsules formed by coacervation into a food in an effective flavor amount. The food is then cooked by heating with the capsules protecting food flavor oil in said food both during cooking and in the resulting cooked product.

22 Claims, No Drawings

METHOD OF FLAVORING AND MECHANICALLY PROCESSING FOODS WITH POLYMER ENCAPSULATED FLAVOR OILS

RELATED APPLICATIONS

This application is a continuation in part of Application Ser. No. 08/204.755, filed on Mar. 2, 1994, entitled "Method of flavoring Foods with Polymer Encapsulated Flavor Oils", now abandoned, which in turn is a continuation of Application Ser. No. 07/859,934, filed on Mar. 30, 1992, entitled "Aqueous Liquid Flavor Oil Capsules, Method of Making and Using in Foods", now abandoned and Application Ser. No.07/859,349, filed Mar. 30, 1992, entitled "Heat-Stable and Fracturable Spray-Dried Free-Flowing Flavor Oil Capsules, Method of Making and Using in Foods", now abandoned. The specification and claims of these applications are incorporated herein by reference in their entireties.

BACKGROUND OF THE INVENTION

A considerable amount of effort has been devoted for many years to provide solid particulate flavoring materials in which a flavor oil is contained in the particulate matrix. Various attempts have been made to fix flavor oils in many different types of organic matrices to provide stable free-flowing powders or particles which contain the flavor oils for flavor release when incorporated into many types of foods. Several principal techniques have been proposed for the preparation of solid particulate flavoring materials. These are plating, spray-drying and encapsulation techniques.

In a typical spray-drying operation, a flavor oil is coated or agglomerated with a solid particulate material so that the flavor oil is dispersed within the spray-dried particle. Spray-drying involves the use of large quantities of air usually at an elevated temperature of, for example, about 250°–450° F. to provide a solid coating or flavor matrix surrounding the flavor oil. Conventional spray drying can cause changes to take place in the flavor oil and can also result in sizeable losses of volatile constituents by evaporation. The loss of flavor may adversely affect the final flavor due to the fact that loss of flavoring material may be made up largely of the very low boiling point constituents with the result that the loss of these constituents changes the flavor of the end product.

More recently, as evidenced by European patent application numbers EP 455598 and 401954, flavor oils have been microencapsulated in the form of coacervate microcapsules, which comprise a core of flavor oil and a coating layer around the core. The coating layer is prepared by coacervation which is a process for the aggregation of colloidal spheres held together by electrostatic forces.

In complex coacervation, the aggregation of colloidal spheres is a mixture of two or more oppositely charged hydrophilic colloidal materials of both cationic and anionic type. For instance, the colloidal material may be selected from the group of materials such as gelatin, casein, agar-agar, gum arabic, carboxymethylcellulose and the like and mixtures thereof. Coacervation, or aggregation to uniformly distribute the colloidal materials around the flavor oil droplets, is then carried out. By diluting an emulsion of the flavor oil in the presence of such colloidal materials with water, adjusting the pH of the emulsion, or temperature, or combinations of such techniques.

It has also been proposed in methods of making flavoring materials to form a coacervate from gelatin and gum arabic colloidal materials for the purpose of encapsulating a garlic flavor oil as disclosed in U.S. Pat. No. 3,647,481. According to this patent, the coacervate capsule slurry is stirred and cooled at 5° C., with stirring, for at least 2.5 hours. The slurry is then spray-dried and the capsules thus formed are filtered then mixed with a vegetable soup base. The resulting capsule-soup based mixture is then added to boiling water thereby creating a soup having a flavor with garlic seasoning.

While many improvements have been made in the art for making particulate flavoring materials, further improvements are needed. It would be advantageous to have methods for continuously encapsulating flavor oil particles with improved particle size control.

It would also be advantageous to have reproducible methods for encapsulation that were adaptable to tonnage production. Further, it would be very desirable in achieving these advantages if improved yields and product quality could also be accomplished. Improved methods of flavoring foods are also desired.

SUMMARY OF THE INVENTION

This invention is directed to a method for flavoring foods with heat-stable and fracturable polymer encapsulated flavor oil capsules.

The heat-stable and fracturable flavor oil capsules may be employed in a wide variety of food applications. For instance, in a preferred form these flavor capsules are provided with a cross-linked gelatin coating that protects the flavor oil in a wide variety of food applications involving cooking and food preparation. "Heat-stable" as that term is used herein means protected against the deteriorating effects of heat in microwave, baking, frying and other cooking or heating applications where temperatures are achieved over a range of about 140° F. to about 450° F. The heat-stable and fracturable flavor capsules are particularly suited for use in deep fat frying of food where the food product containing the flavor capsules is simply submerged in hot oil at about 250° to about 450° F. for the required cooking time and the flavor oil is environmentally protected during cooking so that it may be fractured upon chewing the cooked food to provide a sustained and uniform flavor oil release. Microwaveable foods may be also be prepared from a dry or wet mix of ingredients incorporating the flavor oil capsules for the preservation of the flavor upon microwave heating or cooking at about 140° to about 212° F. and for fracturable sustained flavor release upon chewing the prepared food. Baked foods prepared from flour-based food products having flavor capsules incorporated therein may be prepared by cooking at about 170° to about 425° F. and the advantages of the fracturable flavor oil capsules may similarly be achieved. Extruded food products made from homogeneous mixtures of ingredients may be prepared or cooked. Candies, chewing gums, and other ingestible compositions may be prepared utilizing the flavor capsules that are fracturable upon chewing to provide a high flavor burst over sustained periods.

The objectives of this invention, its advantages and features will be further understood with reference to the following detailed description and specific examples to enable one with ordinary skill in the art to practice the invention.

DETAILED DESCRIPTION OF THE INVENTION

Flavor capsules produced according to this invention contain as much as 70% up to 95% of flavor oil, and are environmentally protected with a heat-stable polymeric coating. The microencapsulated flavor oil capsules are "fracturable", which means that, upon chewing, they provide uniform and sustained release of flavor oil. Spray-dried or other aqueous liquid capsule size control is achieved according to this invention with processes adaptable to tonnage production.

The method of this invention involves microencapsulating discrete droplets of emulsified flavor oil by coacervation in water. During coacervation, a polymeric (i.e., a protein) coating over the discrete droplets is formed to produce microencapsulated flavor capsules. The polymeric coating is then cross-linked by covalent or ionic bonding with a cross-linking agent in the water, and the capsules are spray-dried, or otherwise dewatered, at a suitable temperature for the removal of water to produce heat-stable and fracturable free-flowing solid flavor capsules.

By employing the method of this invention, flavor oils in amounts of up to 95% by weight, within the range of about 50% to 95% by weight, are encapsulated in a polymeric coating material, i.e., at a ratio of about 10:1 to about 5:1 of oil to coating. Usually about 70% to about 95% by weight oil encapsulation is achieved. In another feature of the invention, a drying aid is added to the coacervated emulsion of flavor oil before spray drying or dewatering. This drying aid has the effect of lubricating the spray-dried, or otherwise dried, particles and provides for uniform distribution of the particles.

A variety of flavor oils may be encapsulated by coacervation and spray-dried or dewatered to form the heat-stable and fracturable spray-dried flavor capsules. These flavor oils include flavoring aromatic compounds and/or oils, oleoresins and extracts derived from plants, leaves, flowers, fruits and so forth, and combinations thereof. Flavor oils include cinnamon oil, oil of winter green, peppermint oil, bay oil, thyme oil, spearmint oil, cassia oil, and the like. Artificial, natural and synthetic fruit flavors such as vanilla, and citrus oils including lemon, orange, grapefruit, lime, and fruit essences including apple, pear, peach, strawberry, cherry, and so forth, may be used. These flavoring oils may be used individually or in a mixture as is well known in the art. Further examples of such flavoring oils or flavoring agents of this type may be obtained with reference to the above cited patents, and they are incorporated into this description by reference.

The coating layer, as prepared by coacervation, comprises one or more colloidal materials which must be hydrophilic, gellable and ionizable. Colloidal materials may be selected from the group consisting of gelatin, alginates, casein, gum arabic, carboxymethylcellulose, and the like and mixtures thereof. In a most preferred form, the colloidal material in the coating layer comprises gelatin.

The method of the invention is practiced usually by first forming a solution of a first colloidal material such as gelatin in water above its gelation temperature. Separately, a second colloidal material such as sodium carboxymethylcellulose is added to water to form a clear solution. The two solutions are then mixed and the temperature is reduced whereupon the flavor oil is mixed into the resulting solution and at a mixing speed to form the desired emulsion. Coacervation, or aggregation to uniformly distribute the colloidal materials around the flavoring oil droplets, is then carried out by diluting the emulsion with water, or adjusting the pH and allowing an elapsed time for the colloid to coat the oil droplets. Then, it is necessary to cross-link the colloidal coating on the emulsified oil droplets and, in a preferred form, glutaraldehyde is used to cross-link the gelatin coating surrounding the flavor oil droplets. Alum may also be used to cross-link coated flavor oil capsules, as typically sized up to about 600 microns, normally in a range of about 100 to 300 microns, may be prepared for spray drying.

It is preferred to add a drying aid to the slurry of coated microcapsules in aqueous medium prior to spray drying or dewatering. Silicon dioxide is a preferred drying agent having a particle size of less than 400 mesh, but the fineness of the drying agent is not critical. The coated flavor capsules are now ready for spray drying and this may be accomplished by employing a spray drying tower fitted with an air atomization nozzle for spraying counter-current to the heated air flow. The coated flavor capsules are delivered to the spray nozzle by a pump at a suitable rate per hour. Atomization may be achieved in a number of ways. For example, air atomization, spinning disk or airless atomization may be employed to provide the heat-stable and fracturable spray-dried free-flowing solid flavor oil capsules.

The spray nozzle and pump inherently apply a mechanical shearing force to the capsules. Further details of the spraying method and use of a peristaltic pump, which provide a mechanical shearing force to the capsules, are described hereinafter in Examples A–F. These mechanical processing devices, e.g., spray nozzle and peristaltic pump, inherently subject the capsules to a shearing force following the specific teaching hereinafter in Examples A–F. Thus, the method of this invention and these examples include a step of processing said fracturable capsules by subjecting them to a mechanical shearing force during processing and flavoring said food or ingredients for said food. It has been found that the protein wall of the polymer encapsulated flavor capsules, which has been regarded as a rather porous barrier to flavors and susceptible to processing by mechanical means such as shearing or fracturable forces, can withstand such processing. Mechanical processing and frying, baking and the like, has been found not to degenerate the protein encapsulated flavor.

Furthermore, the dried fracturable capsules and aqueous liquid capsules were each employed in food application, Examples 1–41 hereinafter. For example, mechanical shearing forces were applied to the fracturable capsules as further processed by injection with other ingredients (Example 1), or spraying the flavor capsules onto food (Examples 14 and 40, for example), or extrusion (Examples 34–38, for instance) or comminuted meat (Example 3) or potato products which were ground, mashed and formed (Example 5). Accordingly, these examples further support processing said fracturable capsules by subjecting them to a mechanical shearing force during processing and flavoring foods. Various mechanical shearing means are disclosed hereinafter including atomization, pumping, mixing, injection and extrusion.

It is also preferred to form a slurry of coated microcapsules having about 15% to about 40% by weight capsules solids to achieve the benefits of the aqueous liquid flavor capsules such as flavor cost savings, easy handling and better flavor containment because of reduced flavor volatility in the water. The aqueous liquid flavor capsules are delivered by a pump at a suitable rate per hour in processing to afford easy handling.

DETAILED DESCRIPTION

The following examples illustrate the practice of this invention and its preferred modes. It will be understood, however, that these examples are not intended to limit the scope of the invention.

SPRAY DRYING COACERVATE MICROCAPSULES

EXAMPLE A

Sprayed-Dried Free-Flowing Microcapsules of
Lemon Oil and Cross-Linked Gelatin Coating Gelatin (90 grams) and water (810 grams) were combined at 50° C. and mixed until a clear solution was obtained. Sodium carboxymethylcellulose (9 grams) and 441 grams of 50° C. water were separately mixed until a clear solution formed. The two solutions were then combined and chilled to 36° C. Lemon oil (720 grams) was mixed into the solution until a desired particle size of less than about microns of oil droplets were formed. Thereafter, 4 liters of dilution water at 36° C. were added to the batch. The resultant mixture was slowly cooled to 28° C. A 50% aqueous solution of gluteraldehyde (11.25 grams) was added to cross-link the gelatin. The slurry of microcapsules was then stirred for about eight hours. Thereafter, silicon dioxide, having a particle size of up to 400 mesh (32 grams), was mixed into the slurry to act as a drying aid upon spray drying.

The above slurry of microcapsules was then spray-dried under the following conditions. A 20' pilot-scale spray dry tower was fitted with an air atomization nozzle adapted for spraying counter-current to the air flow. The slurry was then delivered to the spray nozzle by a peristaltic pump running at about 18–24 liters per hour. Air atomization pressure was maintained at about 35–45 psig. The dryer was heated with about 310° F. of inlet air for about 10 minutes. The slurry was then introduced into the dryer at a rate to maintain an exit air temperature of about 220° F. The resulting dry microcapsules (less than about 5% water by weight) were removed from the air stream with a cyclone air/particle separator and the yield was approximately 600 grams (74%) having about 85% by weight oil in the capsules.

EXAMPLE B

Spray-Dried Free-Flowing Microcapsules of
Vegetable Oil and Cross-Linked Gelatin Coating The procedures of Example A were repeated except that vegetable oil was substituted for the lemon oil. After the microcapsules were formed in substantially the same manner, they were spray-dried under essentially the same conditions to produce the spray-dried microcapsules of vegetable oil having a cross-linked gelatin coating. The capsules yield was about 74% by weight having about 85% by weight oil in the capsules.

EXAMPLE C

Spray-Dried Free-Flowing Microcapsules of
Vegetable Oil Containing Garlic and Cross-Linked
Gelatin Coating The procedures of Example B were repeated except that about 50% by weight garlic was incorporated into the vegetable oil. After microcapsules of vegetable oil containing garlic were formed in substantially the same manner, the slurry of microcapsules was then spray-dried under essentially the same conditions to produce the spray-dried microcapsules of vegetable oil containing garlic and having a cross-linked coating of gelatin. The capsules yield was about 68% by weight having about 85% by weight oil in the capsules.

AQUEOUS LIQUID FLAVOR OIL MICROCAPSULES

EXAMPLE D

Aqueous Liquid Microcapsules of Lemon Oil and
Cross-Linked Gelatin Coating

Gelatin (90 grams) and water (810 grams) were combined at 50° C. and mixed until a clear solution was obtained. Sodium carboxymethylcellulose (9 grams) and 441 grams of 50° C. water were separately mixed until a clear solution formed. The two solutions were then combined and chilled to 36° C. Lemon oil (720 grams) was mixed into the solution until a desired particle size of less than about 150 microns of oil droplets were formed. Thereafter, 4 liters of dilution water at 36° C. were added to the batch. The resultant mixture was slowly cooled to 28° C. A 50% aqueous solution of gluteraldehyde (11.25 grams) was added to cross-link the gelatin. The slurry of microcapsules was then stirred for about eight hours and dewatered by decanting or filtering to provide capsule solids of about 15% to about 40% by weight. The flavor oil microcapsules yield was approximately 600 grams (74%) having about 85% by weight oil in the capsules.

EXAMPLE E

Aqueous Liquid Microcapsules of Vegetable Oil
and Cross-Linked Gelatin Coating

The procedures of Example D were repeated except that vegetable oil was substituted for the lemon oil. After the microcapsules were formed in substantially the same manner, they were dewatered essentially the same conditions to produce the aqueous liquid microcapsules of vegetable oil having a cross-linked gelatin coating. The capsules yield was about 74% by weight having about 85% by weight oil in the capsules.

EXAMPLE F

Aqueous Liquid Microcapsules of Vegetable Oil
Containing Garlic and Cross-Linked Gelatin
Coating The procedures of Example E were repeated except that about 50% by weight garlic was incorporated into the vegetable oil.

After microcapsules of vegetable oil containing garlic were formed in substantially the same manner, they were dewatered under essentially the same conditions to produce the aqueous liquid microcapsules of vegetable oil containing garlic and having a cross-linked coating of gelatin. The capsules yield was about 68% by weight having about 85% by weight oil in the capsules.

Aqueous liquid capsules are employed at about 15%–40% solids in the following examples unless otherwise noted.
EXAMPLES OF FOOD APPLICATIONS FOR FRACTURABLE SPRAY-DRIED OR AQUEOUS LIQUID MICROCAPSULES
Deep Fat Fried Foods

Example 1

Whole muscle meats including beef, chicken, fish and seafood are injected with the heat-stable and fracturable spray-dried flavor capsules or aqueous liquid capsules (15%–40% solids) of the above examples by injecting a solution containing water, salt, phosphate and about 0.25% to 1% by weight flavor capsules into the meat flesh. Thereafter, the meat is deep fried at about 325°–400° F. for about 30–90 seconds. During the course of this procedure, the flavor is environmentally protected from release at the hot temperatures by the cross-linked gelatin coating, for example. The cross-linked gelatin prevents the breakdown and release of the flavor. In this instance, flavor oils such as pepper oil, onion oil, lemon oil, dill oil, mustard oil, and other oils or mixtures thereof, may be spray-dried in microcapsules having cross-linked gelatin coatings for injection as a component of the injectable solution.

Example 2

Heat-stable and fracturable spray-dried or aqueous liquid flavor oil microcapsules of the above examples are mixed into bread dough either as a solution or as a powder in an amount of about 0.25% to 1% by weight capsules. The bread dough is then baked and may be separated into cubes. The cubes are then deep fat fried at about 375° F. for about 30 seconds. In this example, onion oil, garlic oil, orange oil, red pepper or garlic oil, or the like flavor oils, are encapsulated according to the above techniques into heat-stable and fracturable microcapsules.

Example 3

Comminuted meat products consisting of approximately 90% meat and about 10% starch/flour base binder having heat-stable and fracturable spray-dried or aqueous liquid flavor oil microcapsules incorporated therein at about 0.25% to 5% by weight are prepared. These products are then fried at about 350° F. for about 60–120 seconds. Flavors that may be incorporated into the flavor capsules include those identified in Example 1 above and such oils are protected from the heating environment, deep fat frying oil, and other environmental conditions so that upon chewing the capsules are fracturable to release the encapsulated flavor oil.

Example 4

Raw dough products, for example, doughnuts and pastries, were prepared by mixing spray-dried or aqueous liquid flavor capsules into ingredients consisting of approximately 51% flour, 5% sugar, 1% salt, 40% water and 0.5% yeast or 1% chemical leavening agent and fried at about 350°–400° F. for about 30–120 seconds. In these examples, spray-dried flavor capsules of fruit flavors such as berry oil, lemon oil, lime oil, and the like, are prepared by the flavor encapsulating process of this invention for incorporation into the dough products at levels of about 0.25% to 1% by weight.

Example 5

Potato sticks from ground potato or potato strips are made by first forming a mash of potato ingredients containing about 1% by weight the spray-dried or aqueous liquid flavor capsules for frying at about 350° F. for about 60 seconds. In this example, the flavor capsules may contain a spice or similar flavor oil identified in Example 1 above and other oils in imparting bacon, chili or pepperoni flavors to the ultimate product.

Example 6

Corn chips, tortillas and pork rinds are made by first forming a mash of ingredients composed of the appropriate flour, salt and water containing about 1% by weight spray-dried or aqueous liquid flavor capsules for frying at about 350°–400° F. for about 45–90 seconds. Flavors oils of the type identified in the above examples may be spray-dried for encapsulation into microcapsules and incorporation into the food that would then yield upon chewing the burst of the appropriate flavor(s).

Examples 7–9

The procedures of examples 1–3 are repeated to provide a food product containing about 1% by weight flavor capsules. Then, a liquid batter consisting of approximately 50% flour and 50% water is coated onto the food product to form a coating of the batter. The coated food product was deep fat fried to provide a fried food product with a battered coating. It will be understood that the flavor capsules may be incorporated into the batter, rather than in the food product that is coated with the batter, prior to deep fat frying.

Example 10

Whole or cut pieces of vegetables and fruit are coated with a liquid batter consisting approximately of 50% flour and 50% water containing about 1% by weight spray-dried or aqueous liquid flavored capsules. In this case, vegetables such as mushrooms, zucchini or broccoli may be coated with the batter containing the flavor capsules. Spray-dried flavor capsules containing onion oil, garlic oil, lemon oil or the like, depending upon the desired flavor, may be employed in the batter prior to deep fat frying.

Example 11

Pieces of cheese may be substituted for the vegetables or fruit of Example 10 and the procedure repeated in order to produce fried cheese products having a batter containing the flavor capsules.

Examples 12–13

Potato strips or onion rings may be substituted for the vegetables or fruit in Example 10 and battered in a similar fashion with coating on the outside of the strips or onion rings to incorporate the fracturable flavor capsules containing onion, pepper, garlic, or other flavoring oils prior to deep fat frying.

Example 14

In addition to coating any of the above food products with a batter, a breading may be subsequently coated on the outside of the battered food product. The breading may be composed of, but no limited to, dried ground bread, bread crumbs, corn flour, corn grits, corn flakes, rice crumbs, dried pasta, cracker meal, dried potato meal, and blends of such breading.

Furthermore, aqueous liquid flavor capsules (15%–40% solids) may be sprayed onto food products like cereal, crackers or snacks and dried to remove the water at 5–15 minutes at 175°–300° F. without significant flavor loss. For examples, water 25%–35% containing 10%–20% liquid flavor capsules and sugar 55%–65% where the capsules are about 1% by weight may be spray coated onto the food.

Example 15

In addition to forming a batter coating, a casing may be employed instead where, for instance, a hot dog may be encased with a dough consisting of approximately 50% flour, 6% sugar, 1% salt, 2% dry milk, 40% water and 1% yeast. The spray-dried or aqueous liquid flavor capsules may be incorporated into the encased food or the casing at a suitable level prior to deep fat frying in manner similar to the above examples.

The above Examples 1–15, demonstrate the incorporation of heat-stable fracturable spray-dried or aqueous liquid free-flowing flavor capsules that will release upon chewing the flavor oil that has been encapsulated. Furthermore, the fracturable flavor capsules are environmentally protected during deep fat frying from the temperatures on the order of about 325°–400° F. that have been used. The flavor oil is protected by such encapsulation from deterioration or volatilization.

The gelatin or polymeric coating acts as a protective barrier until the flavor is released by fracture upon chewing. In these examples, gelatin that has been cross-linked by gluteraldehyde serves as an edible polymeric coating for microencapsulating the flavor.

II. Microwave Foods

Example 16

A dry mix for a cake is formulated by mixing 43% flour, 42% sugar, 5% corn syrup, 2.5% emulsifier, 2% baking powder and 1% salt. Spray-dried or aqueous liquid flavor oil capsules are incorporated into the dry mix to provide a flavor oil dry mix for rehydration by the customer and microwave cooking. The flavor microcapsules are prepared as described above. For instance, fruit, orange or other flavor oils may be encapsulated in fracturable particles for incorporation in a dry mix at a suitable level and microwave cooking. During microwave cooking of the rehydrated dry mix in the formation of a cake, the flavor is protected against loss by microwave cooking.

Example 17

A dry mix for brownies, or sweet breads is formulated by mixing 32% flour, 45% sugar, 6% shortening, 7% powdered sugar, 3% egg whites, 0.3% baking powder and 2% emulsifier. Spray-dried or aqueous liquid flavor capsules are incorporated into the dry mix at about 1% by weight to provide a flavored dry mix for rehydration by the customer and microwave cooking. The flavor microcapsules are prepared as described above. For instance, fruit, orange or other flavor oils may be encapsulated in fracturable particles for incorporation in a dry mix and microwave cooking. During microwave cooking of the rehydrated dry mix in the formation of brownies or sweet breads, the flavor oil is protected against loss by microwave cooking.

Example 18

A dry mix for biscuits/scones is formulated by mixing 54% flour, 24% shortening, 22% milk and 1% emulsifier. Spray-dried or aqueous liquid flavor capsules are incorporated into the dry mix at about 1% by weight to provide flavor oil capsules and dry mix for rehydration by the customer and microwave cooking. The flavor microcapsules are prepared as described above. For instance, fruit, cinnamon or other flavor oils may be encapsulated in fracturable particles for incorporation in a dry mix and microwave cooking. During microwave cooking of the rehydrated dry mix in the formation of biscuits/scones, the flavor is protected against loss by microwave cooking.

Example 19

A dry mix for bread is formulated by mixing 51% flour, 6% sugar, 1% salt, 1% yeast and 1% emulsifier for addition to 40% water for rehydration. Flavor capsules are incorporated into the dry mix at about 1% by weight to provide a flavored dry mix for rehydration by the customer and microwave cooking. The flavor microcapsules are prepared as described above. For instance, fruit, cinnamon or other flavor oils may be encapsulated in fracturable spray-dried particles for incorporation in a dry mix and microwave cooking. During microwave cooking of the rehydrated dry mix in the formation of bread, the flavor oil is protected against loss by microwave cooking.

Example 20

A dry mix for cookies or cakes is formulated by mixing 43% flour, 25% brown sugar, 20% shortening, 9% egg, 1% water, 0.3% salt, and 0.7% baking soda. Spray-dried or aqueous liquid flavor capsules were incorporated into the dry mix at about 1% by weight to provide a flavored dry mix for rehydration by the customer and microwave cooking. The flavor microcapsules are prepared as described above. For instance, fruit, lemon or other flavor oils may be encapsulated in fracturable particles for incorporation in a dry mix and microwave cooking. During microwave cooking of the rehydrated dry mix in the formation of cookies or cakes, the flavor oil is protected against loss by microwave cooking.

Example 21

A sauce may be prepared where the flavor capsules have been incorporated as prepared in accordance with the above procedures. For instance, a white sauce may be prepared containing the fracturable spray-dried flavor oil microcapsules containing pepper oil, onion oil, lemon oil, dill oil, garlic oil, or the like, that then would be added as a part of a final product.

Example 22

Microwaveable popcorn kernels containing flavor are prepared by adding fat or oil, kernels and the spray-dried flavor capsules into a typical microwaveable bag. In this case, the flavor may include a chili oil, tallow flavor or the like, depending upon the desired flavor in heat-stable spray-dried fracturable capsule form.

The kernels may be popped in a microwave at full power for an appropriate period of time, normally approximately 3 minutes. During microwaving, the flavor is protected against deterioration or loss.

Example 23

Any of the above whole muscle meats such as beef, chicken, fish and seafood that are flavored by injection in Example 1 above, may form the basis for a prepared meal, casserole, stew and other microwaveable dishes where the spray-dried or aqueous liquid flavor capsules are incorporated into the product. The food product would either be cooked or prepared for reheating in the microwave.

Example 24

Oatmeal/farina may be combined with spray-dried or aqueous liquid flavor capsules for heating in the microwave and cooking for approximately two minutes in order to provide a flavored oatmeal/farina upon chewing where the flavor was environmentally protected during microwaving.

III. Baked Foods

Example 25

A chemically leavened or yeast leavened bread is formulated containing approximately 50% flour, 6% sugar, 1% salt, 40% water and 1% yeast or a chemical leavening agent. In this example, spray-dried or aqueous liquid flavor capsules are incorporated at about 1% by weight or at a suitable level into the dough. Such flavor capsules are prepared in accordance with the above examples and may be exemplified by those set forth in Example 2 above. During fermentation and subsequent baking for about 20–60 minutes at about 325°–370° F, the flavor oil is protected against baking temperatures and the surrounding environment.

Example 26

Cookies were formulated containing approximately 50% flour, 23% shortening, 16% sugar, 5% water, 5% egg, 0.25% salt and 0.12% soda. In this example, spray-dried or aqueous liquid flavor capsules are incorporated at about 1% by weight into the dough. Such flavor capsules are prepared in accordance with the above examples and may be exemplified by those set forth in Example 2 above. During subsequent baking for about 10–20 minutes at about 325°–370° F., the flavor oil is protected against baking temperatures and the surrounding environment.

Example 27

Crackers/baked snacks were formulated containing approximately 64% flour, 24.6% water, 7.5% shortening, 2.5% sugar, and 0.6% salt. In this example, a spray-dried or aqueous liquid flavor capsules are incorporated at about 1% by weight into the dough. Such flavor capsules are prepared in accordance with the above examples and may be exemplified by those set forth in Example 2 above. During fermentation and subsequent baking for about 8–15 minutes at about 400°–450° F., the flavor oil is protected against baking temperatures and the surrounding environment.

Example 28

Cakes were formulated containing approximately 40% flour, 2% baking powder, 1% salt, 47% sugar, and 10% shortening. In this example, spray-dried or aqueous liquid flavor capsules are incorporated at about 1% by weight into the dough. Such flavor capsules are prepared in accordance with the above examples and may be exemplified by those set forth in Example 2 above. During fermentation and subsequent baking for about 25–35 minutes at about 350° F., the flavor oil is protected against baking temperatures and the surrounding environment.

Example 29

Tortillas were formulated containing approximately 50% flour, 40% water, 6% sugar, 1% salt and 1% yeast. In this example, spray-dried or aqueous liquid flavor capsules are incorporated at about 1% by weight into the dough. Such flavor capsules are prepared in accordance with the above examples and may be exemplified by those set forth in Example 2 above. During fermentation and subsequent baking for about 8–10 minutes at about 350°–400° F., the flavor oil is protected against baking temperatures and the surrounding environment.

Example 30

Pie shells were formulated containing approximately 56.2% flour, 25% shortening, 16% water, 1% salt, 1% dextrose, 0.2% calcium carbonate and 0.1% soda. In this example, flavor capsules are incorporated at about 1% by weight into the dough. Such flavor oil capsules are prepared in accordance with the above examples and may be exemplified by those set forth in Example 2 above. During fermentation and subsequent baking for about 8–12 minutes at about 325°–400° F., the flavor oil is protected against baking temperatures and the surrounding environment.

Example 31

Frostings were formulated containing approximately 76% powdered sugar, 6% milk, 2% cream, 10% shortening and 5% egg white. In this example, flavor capsules are incorporated into the frosting at a suitable level. Such flavor oil capsules are prepared in accordance with the above examples and may be exemplified by those set forth in Example 2 above. In this case, after mixing, no cooking is needed because it may be served as a frosting.

Example 32

Fruit fillings were formulated containing approximately 30% fruit puree, 20–30% water, 10–35% corn syrup, 3–10% sugar and 2–6% stabilizer. In this example, flavor oil capsules are incorporated at about 1% by weight into the mixture. Such flavor oil capsules are prepared in accordance with the above examples and may be exemplified by those set forth in Example 2 above. During fermentation and subsequent baking for about 10–30 minutes at about 165°–190° F., the flavor oil is protected against baking temperatures and the surrounding environment.

Example 33

Pressed snacks or rice cakes may be prepared where grain would be pressed or bound together through adherence of a starch solution or water spray containing a suitable amount of flavor oil capsules prepared in accordance with the above procedures. Any of the flavors exemplified by onion, garlic, orange, pepper, lemon, mustard or other oils may be employed as the flavor oil in the microcapsule.

IV. Extruded Food Products

Example 34

A cereal or a snack-like product is produced by mixing about 10–95% flour, about 5–15% water, 1–90% starch, about 1% salt, about 10% sugar and 0.5% calcium carbonate. The ingredients were formed into a homogeneous mass that may be extruded into any one of a number of food forms and cooked either simultaneously during extrusion or thereafter. Spray-dried or aqueous liquid flavor oil capsules produced in accordance with the preceding examples and providing any one of a number of the above stated flavors such as onion, garlic, pepper oil, lemon oil, and so forth, may be mixed together in amounts of from about 0.25% to 5% by weight with the above ingredients in order to environmentally protect the flavor oil and provide a fracturable capsule whereby the burst of flavor may be achieved upon mastication.

Example 35

The procedure according to Example 34 is repeated except that the formula for the extrudable food product is modified to provide a beef leather or jerky composition including proteins that have been cooked out, shredded, and extruded. The flavor oil capsules are again incorporated into the ingredients of the mass prior to extrusion and/or cooking to achieve the fracturable flavor oil capsules in the food product and the benefits of this invention.

Example 36

A dough consisting of about 60–80% flour, 0–10% eggs, 0–20% water and about 1% salt was prepared by mixing these ingredients with a suitable amount of flavor particles produced in accordance with the above examples. Upon formation into a homogeneous mass, followed by extrusion, noodles may be prepared containing the fracturable flavor oil capsules.

Example 37

A fruit leather or similar product is prepared by combining as dry ingredients 34% high fructose corn syrup, 29% sugar, 11% water or fruit puree, 7–15% starch, 2% emulsifier, 1% citric acid and 2% vegetable oil. The flavor oil capsules are incorporated into the ingredients in a suitable amount to accentuate the fruity flavor. A fruit flavor oil may be encapsulated according to the above technique by coacervation and spray-dried to produce the fracturable flavor oil capsules. The ingredients are formed into a homogeneous mass, extruded and cooked for about 1–3 minutes at about 200°–212° F.

Example 38

A licorice product was made by combining about 45.7% flour, about 7.7% starch, about 13% water, about 19% cake flour, about 8% sugar, about 2% emulsifier, about 2% oil, about 0.3% salt and about 1% citric acid. Spray-dried or aqueous liquid flavor oil capsules containing flavor oils such as cherry, orange, lemon or the like were incorporated in with the other ingredients in a suitable amount and environmentally protected during extrusion and cooking for about 6–10 minutes at about 180°–212° F.

V. Miscellaneous Food Products

Example 39

A candy product was prepared by combining about 51% sugar, 45% corn syrup and about 4% water with about 1–5% spray-dried or aqueous liquid flavor oil capsules prepared in accordance with the above techniques containing orange oil, lemon oil, lime oil or other fruity oils, for example. After combination of the ingredients, the product is cooked in a pan at about 280°–285° F. for about 1–5 minutes to provide a candy product.

Example 40

A food product having the perception of fat with a low fat or fatty oil dose is made by providing spray-dried or aqueous liquid capsules containing vegetable oil in accordance with the above-described techniques to provide a fracturable fatty oil capsule that may be coated onto a food product or incorporated into the food product in accordance with the techniques described in Examples 1–15, for example. In these examples, a low dose of fat in such finely divided form as contained in the fracturable capsules, upon chewing, will be released imparting the perception of a high fat content when deposited on the teeth, tongue and taste buds.

Example 41

A chewing gum is prepared by providing a typical gum base containing gum, starch and/or protein and a suitable amount of the spray-dried flavor oil capsules of the above examples. The capsules protect the flavor oil from molecular inclusion in the macromolecular structure of the gum during processing. The flavor is thus encapsulated and will not be absorbed in the gum matrix such that when fractured upon chewing, a sustained burst of flavor oil will be released.

In view of the above detailed description, other variations will become apparent to a person of ordinary skill in the art and such are within the scope of this invention.

We claim:

1. A method of flavoring foods comprising incorporating heat-stable and fracturable protein encapsulated flavor oil capsules formed by coacervation into meat flesh in an effective flavor amount, processing said fracturable capsules by subjecting them to a mechanical shearing force by injection of said flavor oil into the meat flesh prior to cooking, cooking said meat flesh by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

2. A method of flavoring foods comprising incorporating heat-stable and fracturable protein encapsulated flavor oil capsules formed by coacervation into a food in an effective flavor amount, processing said fracturable capsules by subjecting them to a mechanical shearing force by spraying of said flavor capsules on said food or ingredients for said food, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

3. A method of flavoring foods comprising incorporating heat-stable and fracturable protein encapsulated flavor oil capsules formed by coacervation into a formed and mashed food in an effective flavor amount, processing of the formed and mashed food containing said fracturable capsules by subjecting them to a mechanical shearing force in flavoring said food or ingredients for said food, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

4. A method of flavoring foods comprising incorporating heat-stable and fracturable protein encapsulated flavor oil capsules formed by coacervation into a food selected from the group consisting of beef, chicken fish and seafood in an effective flavor amount, processing said fracturable capsules by subjecting them to a mechanical shearing force in flavoring said food or ingredients for said food, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

5. The method of claim 4 comprising injecting said flavor oil capsules into the meat flesh prior to cooking.

6. A method of flavoring foods comprising incorporating heat-stable and fracturable protein encapsulated flavor oil capsules formed by coacervation into a flour-based food in an effective flavor amount, processing said fracturable capsules by subjecting them to a mechanical shearing force by mixing said capsules with flour and water to form a dough product, cooking said dough product at a temperature of about 170° F. to about 425° F. said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

7. The method of claim 6 comprising cooking by frying the dough product in hot oil at a temperature of about 250° F. to about 450° F.

8. The method of claim 6 comprising cooking by baking the dough product at a temperature in the range of about 170° F. to about 425° F.

9. A method of flavoring foods comprising incorporating heat-stable and fracturable protein encapsulated flavor oil capsules formed by coacervation into a food selected from the group consisting of beef, chicken, fish and seafood in an effective flavor amount, processing said fracturable capsules by subjecting them to a mechanical shearing force selected from the group consisting of atomization, pumping, mixing, injection and extrusion in flavoring said food or ingredients for said food, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

10. A method of flavoring foods comprising incorporating heat-stable and fracturable protein encapsulated flavor oil capsules formed by coacervation into a food in an effective flavor amount, processing said fracturable capsules by subjecting them to a mechanical shearing force by first forming a liquid coating containing said capsules and depositing said liquid coating onto said food or ingredients for said food, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

11. The method of claim 10 wherein said food is selected from the group consisting of meat, vegetable, fruit, cheese, potato, and flour-based food product.

12. A method of flavoring foods comprising incorporating heat-stable and fracturable protein encapsulated flavor oil capsules formed by coacervation into a food in an effective flavor amount, processing said fracturable capsules by subjecting them to a mechanical shearing force in flavoring said food or ingredients for said food, cooking by frying the food in hot oil at a temperature of about 200° F. to about 450° F., said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

13. The method of claim 12 wherein said food is selected from the group consisting of meat, vegetable, fruit, cheese, potato, and flour-based food product.

14. A method of flavoring foods comprising incorporating heat-stable and fracturable protein encapsulated flavor oil capsules formed by coacervation into a food in an effective flavor amount, processing said fracturable capsules by subjecting them to a mechanical shearing force in flavoring said food or ingredients for said food, cooking said food by microwave heating at a temperature of about 140° F. to about 212° F., said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

15. The method of claim 14 wherein said food is selected from the group consisting of meat, vegetable, fruit, cheese, potato, and flour-based food product.

16. The method of claim 14 wherein the food is a flour-based food product and the method includes processing a dry mix of ingredients for said flour-based food product containing said flavor oil capsules for rehydration with water before microwave heating.

17. The method of claim 16 wherein said flour-based food product is selected from the group consisting of cake, brownies, bread, biscuit, cookies and pie.

18. A method of flavoring foods comprising incorporating heat-stable and fracturable protein encapsulated flavor oil capsules formed by coacervation into popcorn kernels in an effective flavor amount, processing said fracturable capsules by subjecting them to a mechanical shearing force by spray drying said capsules onto said popcorn kernel, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

19. The method of claim 18 wherein said popcorn kernels further contain a fat for microwave cooking of said popcorn kernels.

20. A method of flavoring foods comprising incorporating heat-stable and fracturable protein encapsulated flavor oil capsules formed by coacervation into a food in an effective flavor amount, processing said fracturable capsules by subjecting them to a mechanical shearing force by extrusion of ingredients for said food containing said capsules in flavoring said food or ingredients for said food, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

21. The method of claim 20 wherein said food is a flour-based food product and cooking said product at a temperature in the range of about 170° F. to about 425° F.

22. A method of flavoring foods comprising incorporating heat-stable and fracturable protein encapsulated flavor oil capsules formed by coacervation into a food in an effective flavor amount, said fracturable capsules containing a fat or vegetable oil to provide a low dose of fat or oil in said food with a high fat or oil dose perception, processing said fracturable capsules by subjecting them to a mechanical shearing force by coating said food with said fracturable capsules, cooking said food by heating, said encapsulating protein preventing the deterioration and volatilization of said flavor oil from said capsules in said food both during said flavor processing and cooking, and in the resulting cooked food, said capsules being fracturable upon chewing said cooked food to provide a uniform and sustained flavor oil release.

* * * * *

UNITED STATES PATENT AND TRADEMARK OFFICE
CERTIFICATE OF CORRECTION

PATENT NO. : 5,759,599
DATED : June 2, 1998
INVENTOR(S) : Daniel J. Wampler, et al.

It is certified that error appears in the above-identified patent and that said Letters Patent is hereby corrected as shown below:

Column 5, line 12, after "of less than about"     insert --150--

Column 6, line 51, before "Deep Fat Fried Foods"     insert -- I. --

Column 13, line 64, after "oil"     insert --capsules--

Signed and Sealed this

Twenty-ninth Day of September, 1998

Attest:

BRUCE LEHMAN

Attesting Officer     Commissioner of Patents and Trademarks